US010689533B2

(12) United States Patent
Gaudl

(10) Patent No.: US 10,689,533 B2
(45) Date of Patent: Jun. 23, 2020

(54) ENERGY CURABLE LITHOGRAPHIC INKS CONTAINING LACTIC ACID RESINS

(71) Applicant: SUN CHEMICAL CORPORATION, Parsippany, NJ (US)

(72) Inventor: Kai-Uwe Gaudl, Bavaria (DE)

(73) Assignee: Sun Chemical Corporation, Parisippany, NJ (US)

(*) Notice: Subject to any disclaimer, the term of this patent is extended or adjusted under 35 U.S.C. 154(b) by 766 days.

(21) Appl. No.: 14/905,913

(22) PCT Filed: Jul. 29, 2014

(86) PCT No.: PCT/US2014/048618
§ 371 (c)(1),
(2) Date: Jan. 18, 2016

(87) PCT Pub. No.: WO2015/023428
PCT Pub. Date: Feb. 19, 2015

(65) Prior Publication Data
US 2016/0152847 A1 Jun. 2, 2016

Related U.S. Application Data

(60) Provisional application No. 61/864,697, filed on Aug. 12, 2013.

(51) Int. Cl.
C09D 11/104 (2014.01)
B65D 65/42 (2006.01)
(Continued)

(52) U.S. Cl.
CPC ............ C09D 11/104 (2013.01); B65D 65/42 (2013.01); C08G 63/06 (2013.01); C08G 63/78 (2013.01);
(Continued)

(58) Field of Classification Search
CPC ......... C09D 11/00; B65D 65/00; C08G 63/00
See application file for complete search history.

(56) References Cited

U.S. PATENT DOCUMENTS 7,667,062 B2    2/2010  Farone et al.
2007/0276090 A1* 11/2007 Aoki ................. C08L 33/12
                                                    525/70
(Continued)

FOREIGN PATENT DOCUMENTS

CN    101104706 A   1/2008
CN    103941543 A   7/2014

OTHER PUBLICATIONS

International Search Report issued in International Application No. PCT/US2014/048618 dated Nov. 14, 2014.
(Continued)

Primary Examiner — Scott R. Walshon
Assistant Examiner — Sathavaram I Reddy
(74) Attorney, Agent, or Firm — Charles C. Achkar; Ostrolenk Faber LLP.

(57) ABSTRACT

The present invention provides lactic acid polyester resins that are readily soluble in acrylates, and novel acrylated polyester resins thereof. The present invention further provides novel energy curable inks and coating compositions comprising the lactic acid polyester resins, and/or acrylated polyesters. The energy curable inks and coating compositions are especially useful for lithographic and flexographic printing.

14 Claims, 1 Drawing Sheet

Elapsed time (sec)

(51) Int. Cl.
    C08G 63/06    (2006.01)
    C09D 11/101   (2014.01)
    C08G 63/91    (2006.01)
    C08G 63/78    (2006.01)
    C09D 11/037   (2014.01)

(52) U.S. Cl.
    CPC .......... *C08G 63/912* (2013.01); *C09D 11/037* (2013.01); *C09D 11/101* (2013.01)

(56) References Cited

U.S. PATENT DOCUMENTS

| | | |
|---|---|---|
| 2009/0148715 A1 | 6/2009 | Lee |
| 2009/0270524 A1 | 10/2009 | Oka et al. |
| 2009/0311937 A1 | 12/2009 | He et al. |
| 2011/0135924 A1* | 6/2011 | Takahira ............ C08G 18/4202 428/355 R |
| 2011/0245420 A1 | 10/2011 | Rasal et al. |
| 2012/0276479 A1* | 11/2012 | Yoo .................... G03G 9/08755 430/109.4 |

OTHER PUBLICATIONS

Written Opinion of the International Searching Authority issued in International Application No. PCT/US2014/048618 dated Nov. 14, 2014.

Drobny, J. G. Radiation Technology for Polymers, Second Edition, May 21, 2010. [Retrieved Sep. 26, 2014]. Retrieved from the Internet.

Office Action with Search Report issued in Taiwan Application No. 103127680, dated Feb. 13, 2018.

International Preliminary Report Issued in International Application No. PCT/US2014/048618, dated Feb. 16, 2016.

European Supplementary Search Report issued in European Application No. 14836657.8, dated Feb. 22, 2017.

Supplementary European Search Report issued in European Application No. 14836657.8, dated Jun. 6, 2017.

Office Action issued in European Counterpart Application No. 14 836 657.8 dated Mar. 21, 2018.

* cited by examiner

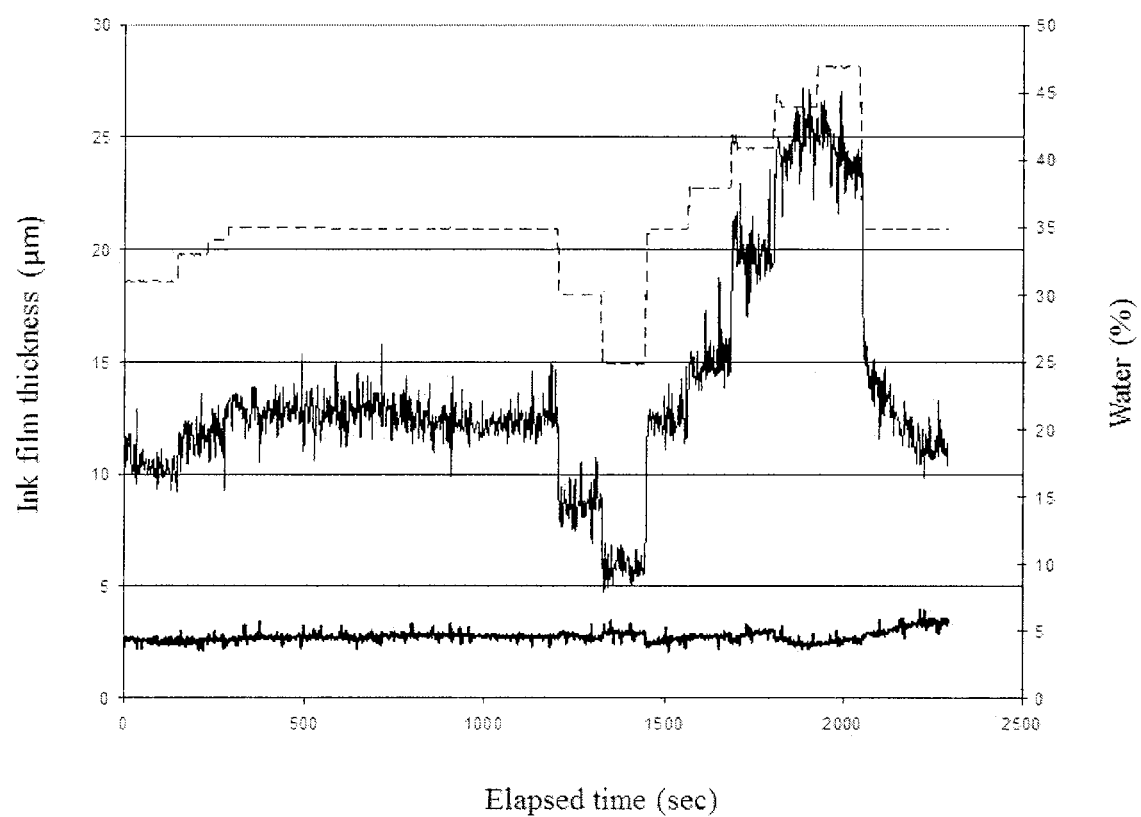

ENERGY CURABLE LITHOGRAPHIC INKS CONTAINING LACTIC ACID RESINS

CROSS REFERENCE TO RELATED APPLICATIONS

The present application is a § 371 National Phase application based on PCT/US2014/048618 filed Jul. 29, 2014, which claims the benefit of U.S. Provisional Application No. 61/864,697 filed Aug. 12, 2013 the subject matter of each of which is incorporated by reference in their entirety.

FIELD OF THE INVENTION

The present invention relates to polyesters based on lactic acid, and energy curable compositions and inks, especially lithographic and flexographic inks, containing lactic acid based polyesters. The polyester preferably consists of at least 20% of lactic acid and preferably at least 1% of a di-, tri-, tetra-, penta- or hexafunctional polyol. The polyesters exhibit improved solubility in acrylic acid ester and are suitable as ink resins for energy curable inks, especially for packaging and indirect food packaging. The invention further relates to polyester acrylates containing esterified lactic acid.

BACKGROUND

In the last decades, the search for sustainable and renewable feedstocks has increased considerably as crude oil based products are expected to become more limited in the future. One of these promising feedstocks is lactic acid, which is made by fermentation of glucose, which is available, for example, from corn or wheat. Due to its widespread availability, lactic acid has become more and more attractive for industries which require larger amounts of this material, such as coatings and inks industries. U.S. Pat. No. 7,588,632 describes water-based flexographic ink with polyactic acid dispersions.

Among printing inks, energy curable printing inks typically consist of a binder, a pigment, an energy curable acrylated monomer, and additives. Unlike conventional inks, which are often based on colophony derivatives and vegetable oils, energy curable inks are mainly made of oil-based chemicals, such as acrylic acid esters, and usually contain a low amount of renewable materials, and there is a desire to increase the amount of renewable material in energy curable inks by using resins based on sustainable materials.

What makes resins based on lactic acid especially suitable for energy curable food packaging inks are their outstanding organoleptic properties. Lactic acid itself is a food additive, and polymeric derivatives of lactic acid are used as food containers, fibers for clothing, or in medical human implants. Thus, such lactic acid materials are safe, and small amounts of residual lactic acid impurities would present a very low health risk in a lactic acid polyester resin, because residual lactic acid monomer is itself an edible food additive.

Attempts to use insoluble higher molecular weight poly (lactic acid) in flexographic inks in the form of an aqueous dispersion are described, for example, in U.S. Pat. No. 7,588,632. However, for making a suitable grinding varnish for an energy curable lithographic ink with good fineness of grind, the lactic acid polyester resin must have a good solubility in acrylic monomers.

On the other hand, typical high molecular weight poly (lactic acid) is insoluble in most common organic solvents, and especially insoluble in acrylic monomers for energy curable lithographic inks, such as trimethylolpropane triacrylate, and ethoxylated derivatives such as ethoxylated pentaerythritol tetraacrylate. Moreover, lactic acid oligomers or degraded poly(lactic acid), available from commercial sources, often exhibit crystallinity and poor solubility in acrylic monomers.

Thus, there is a constant search for alternative sustainable materials such as lactic acid derivatives in compositions and inks, which can replace existing oil-based products without adversely affecting the performance properties.

SUMMARY OF THE INVENTION

According to the present invention, resins based on lactic acid become quite soluble in acrylic acid esters for energy curable inks when co-condensed with 1-30% of a polyol, especially a polyol having three or more hydroxyl groups, such as glycerol, trimethylol propane, pentaerythritol or sorbitol. Moreover, if such an aforementioned polyol is utilized, a drastic reduction in viscosity is observed. This is advantageous as it allows the possibility to introduce more sustainable material into the formulation, and more overall formulation latitude, without high viscosity build, and is favorable for the use in low viscous compositions as well, such as lithographic and flexographic energy curable inks.

The present invention provides novel compositions comprising lactic acid polyester and an acrylic acid ester.

In certain embodiments, the lactic acid polyester resins are soluble in acrylic acid esters.

In one aspect, the invention provides lactic acid polyester resins comprising a compound of general Formula 1:

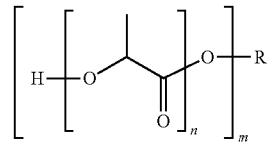

Formula 1 wherein:
R is selected from the group consisting of a di-, tri-, tetra-, penta- and hexavalent polyol;
n is an integer from 1-50; and
m is an integer from 1-6.

In certain embodiments, the lactic acid polyester resin comprises at least 20% lactic acid.

In another embodiment, the lactic acid polyester resin comprises at least 30% lactic acid.

In another embodiment, the lactic acid polyester resin comprises at least 40% lactic acid.

In another embodiment, the lactic acid polyester resin comprises at least 50% lactic acid.

In another embodiment, the lactic acid polyester resin comprises at least 60% lactic acid.

In another embodiment, the lactic acid polyester resin comprises at least 70% lactic acid.

In certain embodiments, the lactic acid polyester resin comprises at least 1% of a di-, tri-, tetra-, penta- or hexafunctional polyol.

In other embodiments, the lactic acid polyester resin comprises at least 5% of a di-, tri-, tetra-, penta- or hexafunctional polyol.

In yet other embodiments, the lactic acid polyester resin comprises at least 10% of a di-, tri-, tetra-, penta- or hexafunctional polyol.

In a certain aspect, the invention provides novel compositions comprising a lactic acid polyester resin as described above and an acrylic acid ester.

In certain embodiments, the acrylic acid ester is selected from the group consisting of 1,6-hexandiol diacrylate, dipropylene glycol diacrylate, neopentylglycol diacrylate, ethoxylated neopentylglycol diacrylate, propoxylated neopentylglycol diacrylate, tripropylene glycol diacrylate, ethoxylated bisphenol-A-diacrylate, bisphenol-A-diglycidylether diacrylate, ethoxylated bisphenol-A-diacrylates, poly(ethylene)glycol diacrylate, trimethylolpropane triacrylate, ethoxylated trimethylolpropane triacrylate, propoxylated trimethylolpropane triacrylate, propoxylated glycerol triacrylate, pentaerythritol triacrylate, ethoxylated pentaerythritol triacrylate, propoxylated pentaerythritol tetraacrylate, ethoxylated pentaerythritol tetraacrylate, ditrimethylolpropane tetraacrylate, dipentaerythritol pentaacrylate, dipentaerythritol hexaacrylate, and ethoxylated dipentaerythritol hexaacrylate.

In a certain aspect, the present invention provides novel energy curable inks or coatings comprising the composition as described above.

In certain embodiments, the energy curable ink or coating comprises a composition as described above in a concentration of about 2 to 70 weight %.

In certain embodiments, the energy curable ink or coating composition is a lithographic energy curable ink or coating composition.

In a certain aspect, the present invention provides novel lithographic energy curable inks or coating compositions for indirect food packaging having a viscosity of about 5-100 Pas at a shear rate of D=50 l/s.

In certain embodiments, the lithographic energy curable ink or coating composition comprises:
  5-30% of a di-, tri-, tetra-, penta- or hexa-functional acrylic monomer;
  5-30% of an acrylic oligomer;
  2-40% of a polyester as described above;
  0-25% of a colorant;
  0-20% of an oligomeric or polymeric photoinitiator;
  0-1% of a monomeric photoinitiator;
  0-10% of extenders and fillers; and
  0-4% of additives.

In another embodiment, the present invention provides a lithographic energy curable ink for indirect food packaging, wherein the polyester consists of edible monomers.

In another embodiment, the present invention provides a lithographic energy curable ink for indirect food packaging comprising a polyester consisting of edible monomers, wherein the edible monomers are selected from the group consisting of lactic acid, glycerol and sorbitol.

In a certain aspect, the present invention provides a printed article comprising the lithographic ink or coating composition as described above.

In another embodiment, the printed article comprising the lithographic ink or coating composition is a food packaging article.

In one aspect, the present invention provides an acrylated polyester containing lactic acid and an acrylate.

In one embodiment, the acrylated polyesters contain 5-30% esterified lactic acid, an acrylic group content of 1-6 mmol acrylic acid ester groups/g, an acid value of <10 mg KOH/g, and a number average molecular weight of 800-5,000 Daltons.

In one embodiment, the acrylated polyester is made by reacting lactic acid with alcohols and acids and/or anhydrides at a temperature of 140-220° C., and subsequently reacting with acrylic acid at a temperature of 80-130° C.

In a certain aspect, the present invention provides a novel lithographic ink or coating containing an acrylated polyester as described above.

In one embodiment, the lithographic ink or coating contains 2-40% of an acrylated polyester as described above.

In certain embodiments, the energy curable ink or coating composition is a flexographic energy curable ink or coating composition.

In other embodiments, the flexographic energy curable ink or coating composition has a viscosity of about 500-2000 mPas at a shear rate of D=50 l/s.

In certain embodiments, the flexographic energy curable ink or coating composition comprises:
  5-45% of a di-, tri-, tetra-, penta- or hexa-functional acrylic monomer;
  5-30% of an acrylic oligomer;
  2-30% of a polyester of any one of claims 1-12
  0-25% of a colorant;
  0-20% of an oligomeric or polymeric photoinitiator;
  0-1% of a monomeric photoinitiator;
  0-10% of extenders and fillers; and
  0-4% of additives.

In another embodiment, the present invention provides a flexographic energy curable ink or coating for indirect food packaging, wherein the polyester consists of edible monomers.

In another embodiment, the present invention provides a flexographic energy curable ink or coating for indirect food packaging comprising a polyester consisting of edible monomers, wherein the edible monomers are selected from the group consisting of lactic acid, glycerol and sorbitol.

In a certain aspect, the present invention provides a novel flexographic ink or coating containing an acrylated polyester as described above.

In one embodiment, the flexographic ink or coating contains 2-40% of an acrylated polyester as described above.

In a certain aspect, the present invention provides a printed article comprising the flexographic ink or coating composition as described above.

In another embodiment, the printed article comprising the flexographic ink or coating composition is a food packaging article.

In one aspect, the present invention provides a method of making a polyester, comprising reacting lactic acid and at least 1% of a di-, tri-, tetra-, penta- or hexafunctional polyol in a concentration of at least 10 weight % and an acrylic acid ester.

In another aspect, the present invention provides a method of making an acrylated polyester comprising reacting lactic acid with alcohols and acids and/or anhydrides at a temperature of 140-220° C., and subsequently reacting with acrylic acid at a temperature of 80-130° C.

BRIEF DESCRIPTION OF THE DRAWINGS

FIG. 1: Depicts the ink film thickness and fountain solution control of the ink of Example 14 on the ink evaluation unit KGB-0024. The upper dotted line is the water setting for the fountain solution on KGB-0024, the middle line is the measured water content near the printing plate, and the lower thick line is the measured ink film thickness near the printing plate.

DETAILED DESCRIPTION

The present invention provides lactic acid polyester resins. The lactic acid polyester resins are soluble in acrylates, to provide energy curable compositions. The present invention further provides energy curable inks and coating compositions comprising the lactic acid polyester resins, and/or acrylated polyesters. The energy curable inks and coating compositions are especially useful for lithographic printing and flexographic printing.

The present invention provides lactic acid polyester resins comprising lactic acid and an acrylic acid ester.

In certain embodiments, the lactic acid polyester resins are soluble in acrylic acid esters.

An example for the formation of such a lactic acid polyester resin of the invention from lactic acid and a polyol is depicted below for Formula 1,

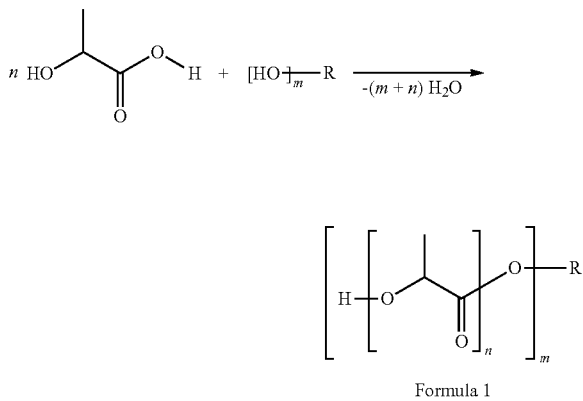

Formula 1 wherein:
R is selected from the group consisting of a di-, tri-, tetra-, penta- and hexavalent polyol;
n is an integer from 1-50; and
m is an integer from 1-6.

For making lactic acid polyester resins, the starting material lactic acid used can be D-lactic acid, L-lactic acid, or mixtures thereof. Typically, the lactic acid comes as 85-90% solution (polymer grade) in water, but also solid lactic acid can be used or lactic acid from recycled feedstocks.

Examples of the polyols which can be used as co-monomers are di-, tri-, tetra-, or hexafunctional alcohols such as, for example, 1,2-ethylene glycol, polyethylene glycol, 1,4-butandiol, 1,6-hexandiol, dipropylene glycol, neopentylglycol, ethoxylated neopentylglycol, propoxylated neopentylglycol, tripropylene glycol, bisphenol-A, ethoxylated bisphenol-A, trimethylolpropane, ethoxylated trimethylolpropane, propoxylated trimethylolpropane, glycerol, propoxylated glycerol, pentaerythritol, ethoxylated pentaerythritol, propoxylated pentaerythritol, ditrimethylolpropane, dipentaerythritol, ethoxylated dipentaerythritol and sorbitol, and the like.

For resins of the present invention, especially suitable in food packaging inks, glycerol and sorbitol are preferred.

The formation of the lactic acid polyester resins is preferably done at temperatures of 130-220° C., more preferably at 160-195° C. Beyond 200° C., there is an increasing risk of decomposition of lactic acid and discoloration. The reaction can be done without catalyst, but for a reduction of the conversion time and higher molecular weights, a catalyst is suitable. Examples of suitable catalysts include strong acids such as phosphoric acid and methane sulfonic acid, and metal catalysts such as esters based on tin, zinc or titanium such as tin bis(2-ethylhexyloate), and the like. During the condensation, water is removed from the reaction mixture. To help remove formed water, a nitrogen gas stream is suitable. Then, a vacuum is applied at a preferred pressure of 500-100 hPa, more preferred 200-50 hPa, in order to build up molecular weight, and remove residual lactic acid and lactide (cyclic lactic acid dimer), which can occur as a side product. The stripping process also removes odor from the reaction mixture, which can be present if the lactic acid starting material is of a lower quality and contains impurities such as pyruvic acid. For further purification, the lactic acid polyester resins can be treated with a base, such as calcium carbonate, to neutralize lactic acid impurities.

The obtained products are preferably colorless to yellow viscous liquids or hard solid resins having a molecular weight of 500-20,000 Daltons, and are soluble in ketones such as methyl ethyl ketone, or acetates such as ethyl acetates, and many acrylic acid esters. The resin composition and characterization of lactic acid polyester resins is given in Examples 1-12. The lactic acid resins consist mainly of the structure of Formula 1, as the primary hydroxyl group of the alcohol is more reactive than the secondary alcohol of lactic acid, which remains as end standing groups. However, polyester of a more sophisticated structure can also be formed, where the polyol is not only the center of the molecule but provides further branching. If, for any purpose, higher molecular weight lactic acid resins are required, they can be made, for example, by a ring-opening polymerization of lactic acid dimer (lactide) in the presence of a polyol and metal catalyst such as zincoctoate at 120-200° C. Then, molecular weights of 20,000-60,000 are available.

Resins of the invention, based on lactic acid, when co-condensed with 2-30% of a polyol, especially with a polyol having three or more hydroxyl groups, showed increased solubility and reduced viscosity in acrylic monomers and are suitable for use in making energy curable inks and coatings.

For example, a Composition 1 based on lactic acid polyester resin modified with ~10% pentaerythritol (Example 1), was compared to a Composition 2 based on a lactic acid polyester resin made from pure dl-lactic acid (Comparative Example 12). See Table 1 for results.

Varnish Compositions 1 & 2 were made by dissolving the lactic acid resins from Example 1 and Comparative Example 12 in trimethylol propane triacrylate (SR 351 from Sartomer Company USA) at an elevated temperature (50-70° C.) and allowed to cool down to room temperature.

Table 1 shows that a lactic acid polyester resin, suitable for energy curable lithographic inks of the present invention and modified with a polyol (Example 1), is much more compatible with acrylic acid ester monomers and shows a much reduced viscosity despite a similar acid value and molecular weight, compared to a lactic acid polyester resin without polyol (Example 12).

TABLE 1

Comparison of lactic acid polyester resin modified with PE and
a resin made with pure dl-lactic acid

| Lactic acid polyester resin | Molecular number average [Daltons] | Molecular weight average [Daltons] | Acid Value [mg KOH/g] | Composition properties | | |
|---|---|---|---|---|---|---|
| | | | | Varnish Composition | Appearance* | Viscosity* [Pa · s] |
| Example 1 (~10% PE) (Branched type) | 1250 | 1650 | 49 | 1 | Clear liquid | 2.85 @50 1/s (25° C.) |
| Example 12 Comparison Resin (Linear type) | 1120 | 1968 | 44 | 2 | Opaque paste | 25.5 @50 1/s (25° C.) |

Varnish = lactic acid polyester resin (45%) dissolved in trimethylol propane triacrylate
*It is well known in the art that a clear liquid represents improved solubility and/or compatibility vs. an opaque paste The solubility is preferably assessed in a multifunctional acrylate such as trimethylol propane triacrylate or ethoxylated multifunctional acrylates such as ethoxylated pentaerythritol tetraacrylate. Typically, lactic acid polyester resins modified with a trifunctional polyol or a higher functional polyol, which exhibit a branched or hyperbranched structure, exhibit a very good solubility in acrylic acid esters.

According to the invention, it is preferred that if an inert lactic acid polyester resin is used in an energy curable ink of the present invention, it exhibits a glass transition temperature (Tg) ≥25° C., in order to give the ink the desired hardness and abrasion resistance after cure, but this is not a requirement, and, in alternate embodiments, the Tg could be <25° C. Moreover, in order to have emulsification properties that will give a good hydrophobic/hydrophilic balance for the lithographic process, a lower polar resin such as a lactic acid polyester resin is preferred, having an acid value in a range of 5-50 mg KOH/g. The polyesters based on lactic acid provide good lithography, good drying properties and a good medium for grinding pigments.

In another embodiment of the present invention, the polyester based on lactic acid can be acrylated, which means polymerizable by radical polymerization. Thus, the lactic acid polyester contains additional acrylic acid ester groups, which can be copolymerized with acrylic monomers during UV-light irradiation to cure the ink film. Such a material can be a liquid, solid or semi-solid. It is known that cross-linked materials impart hardness and solvent resistance, and such materials can be useful in lithographic and flexographic energy curable inks and coatings, which preferably have high curability and solvent resistance.

It is therefore preferred to make a lactic acid containing polyester with a larger amount of polyols with primary alcohol groups, such as trimethylol propane or neopentyl glycol, in order to have primary alcohol groups left for acrylation, and also other acids or anhydrides to maintain a stoichiometric balance. The acrylation of such a polyester intermediate with acrylic is preferably done in the presence of an acidic catalyst such as a methane sulfonic acid, and a polymerization inhibitor. Suitable inhibitors are phenols such as 4-methoxyphenol, a copper or an aluminum based inhibitor, known in the art. Also suitable is a small amount of solvents (preferably <10 weight %) such as cyclohexane, toluene or heptane, to remove water formed during the reaction. In a typical experiment, the condensation of lactic acid with an excess of polyols and multifunctional acids or anhydrides, such as isophthalic acid, is done at about 140-220° C., until the acid value drops below 10 mg KOH/g. Then, the reaction temperature is lowered to about 80-130° C., preferably about 90-110° C., and the remaining hydroxyl groups are esterified with acrylic acid. After completion of the reaction, volatile materials are stripped off under a vacuum of 200-50 hPa. If the reaction is inhibited with a phenolic inhibitor, air sparging is required throughout the whole reaction, especially during vacuum stripping. The obtained acrylated polyesters are pale yellow to light brownish viscous liquids or solids, having a molecular weight of about 800-5,000 Daltons and an acrylic acid ester group content of about 1-6 mmol/g. The acrylic acid ester content can be analytically determined by Michael addition of the acrylic groups with an excess of morpholine. Then, the excess is consumed with acetic anhydride and the formed tertiary amine is titrated with perchloric acid (0.1N). An example for the aforementioned acrylated polyesters is further described in Example 13.

The lithographic and flexographic inks and coatings of the present invention containing inert or acrylated lactic acid polyester resins are made using typical procedures known in the art, usually by dry-grinding or using a flush. In a typical manufacturing procedure for inks, the required amount of dry pigment is mixed with acrylate monomers and oligomers, and additives, on a mixer for 15-30 minutes to wet out all pigment. The pre-mix is then ground on a three roll mill (or other grinding mill) at a pressure of about 1-2 MPa and a temperature of 20-40° C. until the desired grind specifications are met.

For making a lithographic or flexographic ink or coating that is suitable for food packaging, the risk of migration of components of the ink into food must be minimized. It is generally acknowledged that the tendency of a chemical to migrate is a function of mobility and molecular weight.

Therefore, migrating low molecular weight monomeric photoinitiators are preferably minimized, or more preferably completely replaced by oligomeric or polymeric photoinitiators. Suitable photoinitiators are, for example, photoinitiators containing oligomeric benzophenone derivatives such as Omnipol BP from IGM resins, oligomeric amines such as Genopol AB-1 from Rahn Group, or oligomeric type-I-photo initiators such as Omnipol 910 from IGM Company, and the like.

Moreover, to minimize the risk of migration of acrylate monomers, even in the case of incomplete cure, monomers with the highest acrylate functionality and molecular weight are preferred such as di-trimethylol propane hexaacrylate, ethoxylated pentaerythritol tetraacrylate, dipentaerythritol hexaacrylate and ethoxylated dipentaerythritol hexaacrylate, and the like, available from suppliers such as Cytec and Arkema Company. Thus, even if only one of four or six acrylate groups polymerizes, the whole molecule is anchored in the cross-linked acrylate matrix and can no longer migrate.

In an energy curable ink or coating formulation, an inert resin is often used in inks or coatings to impart optimum rheology, adhesion, pigment wetting and hardness. Detected impurities of residual monomers in such resins, which in some cases are also described in safety data sheets of suppliers, are for example, residual methyl methacrylate and styrene in acrylic resins, cyclohexanone and acetophenone in ketone resins, isobutyraldehyde and formaldehyde in aldehyde resins, and methyl styrene and indene in hydrocarbon resins. Although some residual monomers do not represent a health risk at low levels, migration of such monomers may cause a change of the taste or odor of the food, as the migrant may also enter food by contact migration or by gas phase migration.

Therefore, lactic acid polyester resins of the present invention, made by co-condensing lactic acid with small amounts of polyols, preferably edible polyols such as glycerol or sorbitol, pose a lower risk of changing organoleptic properties, because the residual monomers which can be present as impurities, are tested food additives which are edible. It is therefore another embodiment of the invention to provide ink and coating resins for energy curable inks and coatings for food packaging, which consist only of edible monomers.

Radiation curable inks and coatings of the present invention contain the aforementioned polyester resins based on lactic acid, having a preferred weight number average of about 500-20,000 Daltons, more preferably about 1,000-10,000 Daltons, having a preferred glass transition temperature (Tg) >about 25° C., more preferably >about 40° C., and a preferred acid value of about 5-50 mg KOH/g, more preferably 20-35 KOH/g, in a concentration of about 2-40 weight %.

Radiation curable inks and coatings of the present invention may additionally contain the aforementioned acrylated polyester resins based on lactic acid with a weight number average of about 800-5,000 Daltons and an acrylic acid ester group content of about 1-6 mmol/g in a concentration of about 2-40%.

The inks and coatings of the present invention may also additionally contain other acrylated oligomers, preferably with a weight number average of about 400-3,000 Daltons, and an acrylate functionality ≥2, such as, for example, epoxy acrylates, polyester acrylates, acrylated polyurethanes, acrylated polyacrylates, acrylated polyethers, acrylated oils based on linseed oil and soybean and castor oil and mixtures thereof, to impart optimum rheology, pigment wetting, transfer, gloss, chemical resistance and other film properties.

For an ink or coating designed for food packaging, acrylated oligomers based on vegetable oils are preferred.

Typical acrylic monomers used in the inks and coatings of the present invention are preferably esters of acrylic acid with a defined structure, a functionality ≥2, and a weight number average of about 200-800 Daltons, which impart curing speed, solvent resistance, hardness, and allow viscosity adjustment. A non-limiting list of examples of acrylate monomers and oligomers suitable in inks of this invention include 1,2-ethylene glycol diacrylate, 1,4-butandiol diacrylate, 1,6-hexandiol diacrylate, dipropylene glycol diacrylate, neopentylglycol diacrylate, ethoxylated neopentylglycol diacrylates, propoxylated neopentylglycol diacrylates, tripropylene glycol diacrylate, bisphenol-A diacrylate, ethoxylated bisphenol-A-diacrylates, bisphenol-A-diglycidylether diacrylate, ethoxylated bisphenol-A-diacrylates, poly(ethylene)glycol diacrylates, trimethylolpropane triacrylate, trimethylolpropane trimethacrylate, ethoxylated trimethylolpropane triacrylates, propoxylated trimethylolpropane triacrylates, propoxylated glycerol triacrylates, pentaerythritol triacrylate, ethoxylated pentaerythritol triacrylates, propoxylated pentaerythritol tetraacrylates, ethoxylated pentaerythritol tetraacrylates, ditrimethylolpropane tetraacrylate, dipentaerythritol pentaacrylate, dipentaerythritol hexaacrylate, ethoxylated dipentaerythritol hexaacrylates, or mixtures thereof, and preferred are ethoxylated trimethylolpropane triacrylates, ethoxylated pentaerythritol triacrylates and propoxylated pentaerythritol tetraacrylates.

For an ink or coating designed for food packaging, multifunctional acrylates, such as ethoxylated pentaerythritol tetraacrylates, ditrimethylolpropane tetraacrylate, dipentaerythritol pentaacrylate, dipentaerythritol hexaacrylate, ethoxylated dipentaerythritol hexaacrylates or mixtures thereof are preferred.

The energy curable inks and coatings of the present invention may contain one or more colorants in the form of a dye or pigment dispersed therein. Pigments suitable for use in the present invention include conventional organic or inorganic pigments. Representative pigments may, for example, be selected from the group of Pigment Yellow 1, Pigment Yellow 3, Pigment Yellow 12, Pigment Yellow 13, Pigment Yellow 14, Pigment Yellow 17, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 111, Pigment Yellow 114, Pigment Yellow 121, Pigment Yellow 126, Pigment Yellow 127, Pigment Yellow 136, Pigment Yellow 138, Pigment Yellow 139, Pigment Yellow 174, Pigment Yellow 176, Pigment Yellow 188, Pigment Yellow 194, Pigment Orange 5, Pigment Orange 13, Pigment Orange 16, Pigment Orange 34, Pigment Orange 36, Pigment Orange 61, Pigment Orange 62, Pigment Orange 64, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 48:2, Pigment Red 53:1, Pigment Red 57:1, Pigment Red 81:1, Pigment Red 112, Pigment Red 122, Pigment Red 170, Pigment Red 184, Pigment Red 210, Pigment Red 238, Pigment Red 266, Pigment Blue 15, Pigment Blue 15:1, Pigment Blue 15:2, Pigment Blue 15:3, Pigment Blue 15:4, Pigment Blue 61, Pigment Green 7, Pigment Green 36, Pigment Violet 1, Pigment Violet 19, Pigment Violet 23, Pigment Black 7, and the like.

The radiation curable inks and coatings of the present invention may contain, if cured by UV-light, photoinitiators, such as, for example, benzophenones, benzylketals, dialkoxy acetophenones, hydroxyalkyl-acetophenones, aminoalkylphenones, acylphosphinoxides and thioxanthones, for example benzophenone, methylbenzophenone, 4-phenylbenzophenone, 4,4'-bis(dimethylamino)-benzophenone, 4,4'-bis(diethylamino)-benzophenone, 2,2-dimethoxy-2-phenylacetophenone, dimethoxyacetophenone, diethoxy-acetophenone, 2-hydroxy-2-methyl-1-phenylpropan-1-one, 2-benzyl-2-dimethylamino-1-(4-morpholinophenyl)-butan-1-one, 2-methyl-1-[4(methoxythio)-phenyl]-2-morpholinopropan-2-one, diphenylacylphenyl phosphinoxide, diphenyl(2,4,6-trimethylbenzoyl)phosphinoxide, 2,4,6-trimethylbenzoylethoxyphenyl phosphinoxide, 2-isopropylthioxantone, 4-isopropylthioxanthone, 2,4-dimethylthioxanthone, or mixtures thereof, and the like.

The radiation curable inks and coatings of the present invention may further contain the usual additives to modify flow, surface tension, gloss, pigment wetting, and abrasion resistance of the cured coating or printed ink. Such additives contained in inks or coatings typically are surface-active agents, waxes, shelf-life stabilizers, etc. and combinations thereof. These additives may function as leveling agents, shelf-life stabilizers, wetting agents, slip agents, flow agents, dispersants and de-aerators. Preferred additives include fluorocarbon surfactants, silicones and organic polymer surfactants. Examples include the Tegorad™ product lines (commercially available from Tego Chemie, Essen, Germany) and the Solsperse™ product lines (commercially available products of Lubrizol Company).

The radiation curable inks and coatings of the present invention may further contain the usual extenders such as clay, talc, calcium carbonate, magnesium carbonate or silica to adjust water uptake, misting and color strength.

Typically, energy curable offset inks of the present invention show a viscosity of about 5-100 Pas at a shear rate of D=50 1/s measured with a commercial cone and plate rheometer Physika RCS 300 from Anton Paar Company, Germany, which is a typical stress rheometer, and widely used in quality control, as well as in research and development. The inks and coatings are sheared with an increasing shear rate of D=2 to 100 l/s and the value for viscosity is taken at a shear rate of 50 l/s. Preferred is a viscosity of about 20-50 Pas.

Typical values for flow are about 3-15 cm after 15 minutes, measured on an inclined aluminum plate with 1 ml of ink.

The offset inks of the present invention preferably show a tack of 200-450 units measured using a "tack-o scope" instrument (Model 2001) from IGT Testing Systems, Netherlands, which is known to a person skilled in the art. In a typical measurement, 1 ml of ink or coating is distributed on the rubber roller and held at 30° C. for 90 seconds at a roller speed of 50 rpm, then 30 seconds at 300 rpm. Then, the tack value is taken at a roller speed of 150 rpm. The usually preferred tack is about 250-350 units. However, unexpectedly, as shown in example 17, despite the higher ink viscosity of ~60 Pas, the ink exhibits a lower tack (168 units, measured with a Tack-o-scope), compared to standard energy curable UV-offset inks. On average, lithographic and flexographic inks, for example Suncure UV-offset inks (trademark of Sunchemical), show a tack of ~24°-280 units at a viscosity of ~30-35 Pas. The aforementioned low tack can be achieved by a composition of this invention containing an acrylate and a polyester according to Formula 1, in which the polyester is of higher molecular weight and exhibits a molecular number average of >3000 Daltons and a molecular weight average of >6000 Daltons, such as, for example, a polyester described in example 10. In an ink formulation of this invention, the aforementioned composition gives a high viscosity, low tack ink. Low tack inks are highly preferred in the last years, as due to cost reduction, more and more print shops use lower quality paper. With such a low quality paper, fibers of the paper can be easily ripped off by a high tack ink and can lead to print defects also known under the synonym "picking". This can be avoided by a low tack ink of the present invention as described in example 17. Moreover, a composition containing lactic acid polyester of higher molecular weight, as described aforementioned, can be added to a standard offset ink as a tack reducing varnish.

Lithographic Performance:

Before an ink can be run on a press, it is advantageous to be able to predict its performance under conditions that are as close as possible to real press conditions.

This was done in two steps: First, with a high speed lithotronic emulsification tester (Novocontrol GmbH, Germany) with the ink of Example 15 and second with an "Ink evaluation unit" KGB-0024 from Mitsubishi Heavy Industries Ltd. (with the ink of Example 14).

The lithotronic tester can perform emulsification tests at high speed and shear stress. It has been developed for the examination of water-ink interfacial phenomena under controlled conditions by computer support. Regarding water uptake, scumming, tinting and shear stress values under emulsification, the ink of Example 15 behaved very similar compared to commercial UV offset inks from the Sun Chemical Suncure™ product portfolio and is therefore regarded to perform similar on an offset press.

The lithographic performance of the ink of Example 14 was assessed with an "Ink evaluation unit" KGB-0024 from Mitsubishi Heavy Industries Ltd. An "Ink evaluation unit" can easily simulate the behavior of printing materials such as ink, press plate and dampening water under conditions that closely simulate on-press printing conditions. The evaluation unit has a roller arrangement similar to an offset printing press, and the rotation speed covers all printing speeds of offset presses in the market. The difference from an actual printing press is that there is no substrate to be printed onto and the ink transferred from the plate to the blanket is not printed to a substrate, but transferred to a ductor roller and scraped off by a doctor blade. In addition to the other parameters, the transferred ink can be accurately measured by weight of ink collected. By this method, it can be assessed whether an ink under identical print conditions, such as ink and fountain settings, temperature, and roller speed, can provide a better lithographic performance.

As seen in Example 14, in which the lithographic performance is tested, an experimental ink of the present invention containing a lactic acid polyester resin as binder shows a very stable ink film thickness next to the plate during various changes of water settings (FIG. 1, smooth thick line on the bottom). This confirms a robust lithographic performance.

The radiation curable inks of the present invention can be cured by an actinic light source, such as, for example, UV-light, provided by a high-voltage mercury bulb, a medium-voltage mercury bulb, a xenon bulb, a carbon arc lamp, a metal halide bulb, a UV-LED lamp or sunlight. The wavelength of the applied irradiation is preferably within a range of about 200 to 500 nm, more preferably about 250 to 350 nm. UV energy is preferably within a range of about 30 to 3,000 mJ/cm$^2$, and more preferably within a range of about 50 to 500 mJ/cm$^2$. In addition, the bulb can be appropriately selected according to the absorption spectrum of the radiation curable composition. Moreover, the inks of the present invention can be cured under inert conditions or as an ink laminated by a plastic foil.

Alternatively, the energy curable inks of the present invention, with or without photoinitiator, can be cured by electron beam (EB) radiation. Commercially, EB dryers are available, for example, from Energy Science, Inc. (Wilmington, Mass.), or from Advanced Electron Beams, Inc. (AEB) (Wilmington, Mass.). The energy absorbed, also known as the dose, is measured in units of kiloGrays (kGy), wherein one kGy is equal to 1,000 Joules/kg. Usually, the electron beam dose should be within the range of 10 kGy to about 40 kGy for complete curing. With the radiation curable compositions of the present invention, a radiation dose of 20-30 kGy, at an oxygen level of <200 ppm, is usually sufficient to get a dry, solvent resistant ink.

To further demonstrate the press performance of inks of the present invention, Examples 17-18 were printed with a "Didde" web offset UV-press (Graphic System Services, U.S.A.) equipped with two UV-dryers having high pressure mercury bulbs. Both an ink with an inert lactic acid polyester resin and an acrylated lactic acid polyester resin were tested. The ink with the acrylated lactic acid showed a better UV-cure, whereas the ink with inert lactic acid polyester resin exhibited better misting properties. Both Example 17 and Example 18 exhibited good lithographic performance on the Didde press trial.

In addition, inks comprising acrylated polyesters based on lactic acid are useful for use in flexographic printing. Flexographic inks require a much lower viscosity than lithographic inks, typically 500-2000 mPas. This can be achieved by adjusting the ratio of acrylic monomers in the inks described herein. For example, Example 19 describes an energy curable flexographic ink, containing an acrylated polyester based on lactic acid from example 13, that is suitable for flexographic printing.

EXAMPLES

The following examples illustrate specific aspects of the present invention and are not intended to limit the scope thereof in any respect and should not be so construed.

Examples 1-12

Synthesis of Polyester Resins Based on Lactic Acid (General Formula 1)

General Procedure:

dl-Lactic acid, polyol and catalyst were mixed and water was separated at 130-160° C. When the water separation subsided, light vacuum (p=200-500 hPa) was applied and water separation was continued for two hours. Then, a lower pressure (<100 hPa) was applied and the temperature was increased up to 200° C. The condensation reaction was continued until the desired acid value or molecular weight was obtained. The compositions and characterization of these polyester resins are shown in Table 2.

Method of Acid Value Determination:

Acid value was determined according to the following procedure. First, 0.2 to 1.0 g of the sample was weighed into a clean 50 ml Erlenmeyer flask, and dissolved in acetone (10-20 ml). Then 3-5 drops of 1% alcoholic phenolphthalein solution were added. The resulting mixture was titrated with standardized 0.1 N Alcoholic Potassium Hydroxide (KOH) to the first appearance of a pink color which lasted for 15 seconds. The number of mls of KOH solution used was recorded.

Acid value was calculated as:

$$\text{Acid Number} = \frac{\text{ml KOH} \times 0.1 \times 56.1 \text{ (mg KOH/g)}}{\text{Sample weight (g)}}$$

Method of Molecular Weight Determination:

Number average weight (Mn) and mass average weight (Mw) were determined by size exclusion chromatography (GPC) with monodisperse polystyrene equivalent molecular weight calibration standard and GPC columns (manufactured by Tosoh Corp., G1000HXL, G500HXL×1, G100HXL×1), at a flow rate of 1.0 ml/min, eluted with tetrahydrofuran, at a column temperature of 40° C. A differential refractive index detector (RI) and a UV-detector (254 nm) were used. The dispersability was calculated from the measurement results. The formula for dispersability (D) is Mw/Mn.

Method of Color Determination:

Color of the resins was measured using the Lovibond 2000 Comparator with Daylight color measuring system. The samples (50 wt. % solution in ethyl acetate) were visually matched against calibrated, color stable glass standards in test discs. The scale disc color standards used were the Gardner 4/30AS (with the colors 1 to 9) and the Gardner 4/30BS (with the colors 10 to 18).

Method of Determination of Glass Transition Temperature (Tg):

The glass transition temperature was measured by Differential Scanning calorimetry with a DSC-7 instrument (Perkin Elmer) at a scan rate of 10° C. per minute.

TABLE 2

Composition and characterization of lactic acid polyester resins

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 (Comp) |
| Resin Composition | | | | | | | | | | | | |
| Lactic acid [g] | 462 | 471 | 460 | 458 | 458 | 460 | 462 | 462 | 460 | 458 | 457 | 457 |
| Polyol [g] | 45 PE | 32 Gly | 20 PE | 15 Gly | 20 Gly | 5 SO | 43 PE | 32 Gly | 3.2 PE | 9.3 PE | 20.0 PE | — |
| Catalyst [g] | 1.0 PPA | 0.7 PPA | 1.0 PPA | 0.5 MSA | — | 0.25 TSA | 0.5 TO | 0.7 PA | 1.0 TO | 1.0 TO | 1.0 TO | 1.0 PPA |
| Characterization | | | | | | | | | | | | |
| Acid Value [mg/KOH/g] | 49 | 34 | 21 | 47 | 25 | 34 | 5 | 34 | 11 | 25 | 6 | 44 |
| Color [Gardner] | 2 | 2 | 3 | 5 | 3 | 8 | 6 | 2 | 2 | 2 | 3 | 2 |

TABLE 2-continued

Composition and characterization of lactic acid polyester resins

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 (Comp) |
| Mn [Dalton] | 1250 | 1140 | 1400 | 1094 | 1201 | 1151 | 1301 | 1140 | 7900 | 3710 | 1450 | 1120 |
| Mw [Dalton] | 1650 | 1505 | 3400 | 2338 | 2100 | 1901 | 1590 | 1505 | 14500 | 6900 | 1850 | 1968 |
| Tg [° C.] | nd | nd | 34 | nd | nd | 28 | nd | nd | 46 | 37 | nd | nd |

Comp = Comparative;
PE = pentaerythritol;
Gly = glycerol;
SO = sorbitol;
TSA = toluene sulfonic acid;
MSA = methane sulfonic acid;
PPA = polyphosphoric acid;
TO = tinoctoate; (Mn) number average weight;
Mw = mass average,
nd = not determined Example 13

Acrylated Lactic Acid Polyester Resin 110.0 g of lactic acid, 140.0 g of phthalic acid, 110.0 g of neopentyl glycol, 80.0 g of trimethylol propane and 0.2 g of Fascat 4100 (Arkema Company) were mixed and heated under Nitrogen to 195-200° C. The separation of water was continued until the acid value dropped below 5 mg KOH/g. Then, the temperature was lowered to 100° C. and 1.5 g of 4-methoxyphenol, 1.0 g of methane sulfonic acid, 10 ml of toluene and 10 ml of heptane were added. Then, Nitrogen was shut off and air was bubbled through the solution. Then, 130.0 g of acrylic acid was added and the solution was heated to reflux. Water was separated until the acid value dropped below 10 mg KOH/g. Then, vacuum (100 mbar) was applied and the volatile materials were stripped off. A honey-like, viscous pale yellow liquid was obtained.
Characterization:
Molecular Weight:
    Number average weight (Mn): 936
    Mass average weight (Mw): 1308
Color: 3-4 Gardner
Acid value: 6 mg KOH/g
Viscosity: 20.5 Pas at 50° C.

Viscosity was determined with a Physika 300 cone and plate rheometer from Anton Parr GmbH at a shear rate of D=2-100 l/s. The viscosity value at D=50 l/s was recorded. Color, molecular weight and acid value were measured as described.

Example 14

Lithographic Packaging Ink

A cyan experimental UV-curable ink was made on a three roll mill, 3 passes at 1 MPa (25° C.), having the composition and properties shown in Table 3.
Viscosity:
Viscosity was determined with a Physika 300 cone and plate rheometer from Anton Parr GmbH at a shear rate of D=2-100 l/s. The viscosity value at D=50 l/s was recorded.
Tack:
Tack was measured with a calibrated "Tack-o-scope" instrument (Model 2001) from IGT Testing Systems, Netherlands. 1 ml of ink was placed on the EPDM rubber distribution roller at 30° C., distributed for 90 seconds at a roller speed of 50 rpm, then 30 seconds at 300 rpm. The tack value was then taken at a roller speed of 150 rpm.
Flow:
The flow was measured with a vertically arranged aluminum plate on which 1 ml of ink was placed. The distance in cm that the ink ran down the plate after 15 minutes was recorded.

Note: the above test methods for viscosity, tack and flow were used throughout the present application.

TABLE 3

Cyan UV-curable ink

| Material | Weight % |
|---|---|
| Lactic acid resin (Example 8) 48% in trimethylol propane triacrylate | 50.00 |
| Oil based polyester acrylate (IGM) | 10.00 |
| Leveling additive (Dynea) | 0.50 |
| In-can stabilizer (Kromachem) | 1.00 |
| Photoinitiator blend based on aminobenzoates, benzophenones & aminoketones (Sun Chemical) | 13.50 |
| Pigment Blue 15:3 (Sun Chemical) | 22.00 |
| Inorganic filler (Emerys) | 3.00 |
| Total | 100.00 |
| Properties | |
| Viscosity @ 50 s-1 [Pa*s] | 49.60 |
| Tack @ 150 rpm 30° C. [tack-o-scope units] | 320.00 |
| Flow @ 15 min. [cm] | 3.0 |

Example 15

Energy Curable Ink for Food Packaging, Indirect Contact

A cyan experimental UV-curable ink was made on a three roll mill, 3 passes at 1 MPa (25° C.). The composition and properties are shown in Table 4.

Viscosity, tack and flow were measured as described.

The lithographic performance of the ink of example 15 was checked with a high speed lithotronic emulsification tester (Novocontrol GmbH, Germany).

For a Lithotronic testing, 25 g of ink was filled into a mixing bowl, which was then mounted and fixed into position by the clamping arrangement. While stirring the ink under a controlled shear stress, continuous liquid flow into the mixing bowl was achieved by a precision miniature pump. The liquid flow was digitally controlled by the microprocessor system, providing a calibrated flow characteristic.

Conditions: Flow=2 ml/minute at 1200 rpm. T=40° C., deionized water.

No indication of the presence of scum or tinting of the emulsified ink was found. The torque values measured under emulsification were very similar compared to those from commercial UV offset inks from the Sun Chemical Suncure™ product portfolio.

TABLE 4

Energy curable ink for food packaging

|  | Weight % |
|---|---|
| Composition |  |
| Lactic acid resin (Example 8), 40% in tetrafuntional acrylate | 47.00 |
| Oil based polyester acrylate (IGM) | 10.00 |
| Leveling additive (Tego) | 0.50 |
| In-can stabilizer (Rahn) | 1.00 |
| Low migration photoinitiator blend based on oligomeric derivatives of aminobenzoates, benzophenones and thioxanthones (Sun Chemical) | 16.50 |
| Pigment Blue 15:3 (Sun Chemical) | 22.00 |
| Inorganic filler (Emerys) | 3.00 |
| Total | 100.00 |
| Properties |  |
| Viscosity @ 50 s$^{-1}$ [Pa*s] | 36.20 |
| Tack @ 150 rpm 30° C. [tack-o-scope-units] | 280.00 |
| Flow @ 15 min. [cm] | 4.0 |

Example 16

Lithographic Performance

1 Kg of experimental ink (Example 14) was placed into the ink duct of an "Ink evaluation unit" KGB-0024 from Mitsubishi Heavy Industries Ltd. The fountain solution contained de-ionized water, Sunfount 480™ (3%) from Sun Chemical Company, isopropyl alcohol (5%), and re-hardener (0.5%). The roller speed was set to 300 meters per minute, and roller temperature was 30° C. The ink was run for ~20 minutes (starting dampening settings 35%, ink settings constant at 8%) in order to achieve a constant film thickness of ~2.5 μm, measured by an ink thickness sensor near the printing plate.

Then, the fountain solution setting was decreased by 5% after 2 minutes, and 10% after 4 minutes. Then, the fountain solution was re-increased by 10% at 6 minutes, and further increased by 3%, 6%, 9%, and 12% at 8, 10, 12, and 14 minutes respectively, and then back to starting dampening settings. The change of film thickness and water was detected. The amount of transferred ink was 87 g.

During the changes in the experiment, the ink thickness and water conditions were monitored as exhibited in FIG. 1. The target was to obtain a stable ink film thickness near the printing plate (straight thick lower line in FIG. 1) throughout the whole experiment, to confirm a robust lithographic performance. The ink of Example 14 showed a robust lithographic performance.

Example 17-18

Performance on Press

Two cyan experimental UV-curable packaging inks were made on a three roll mill, 3 passes at 1 MPa (25° C.), having the composition and properties shown in Tables 5 and 6.

The inks were tested on a Didde web offset press equipped with two UV-dryers.

Ink Duct Setting:

The ink duct setting determined the size of the opening through which the ink entered the ink train.

Printing Speed:

The velocity of the moving web (substrate) was measured in feet per minute.

Water Window:

The water window was used to give a range of the fountain solution settings for which a targeted print density was achieved. The larger the water window, the more robust lithography is anticipated.

Printed Optical Density:

The achieved optical density of the cured prints under the given ink duct settings and fountain settings were measured in-line with a mounted densitometer.

UV-Cure:

The extent of UV-cure was assessed by a thumb twist test and a solvent resistance test with isopropanol (IPA). Such a test is well known in the art and is, for example, described on page 74 of *Test Methods for UV and EB Curable Systems*, C. Lowe & P. K. T Oldring, SITA Technology, 1994, ISBN 0 947798 07 2.

Good cure was defined as the degree of cure in which no ink was transferred to the thumb, and the ink had a solvent resistance of at least 10 IPA double-rubs. The press operator noted the lamp settings at which good cure was observed:

1 lamp low (best cure)
1 lamp high (good cure)
1 lamp high, 1 lamp low (fair-good cure)
2 lamps high (fair)

Misting:

Misting was assessed at different places on the press, usually near an ink duct and a printing plate. A white piece of paper was placed at a defined distance from the ink rollers, and the press was run for a defined period of time, and at a defined speed and temperature. Then, the ink mist that was transferred to the paper was assessed by visual comparison to a master example, or by measurement with a densitometer. Very little ink on the paper means that the ink has very low misting and low tendency to contaminate the printing press and press room with ink mist.

Visual assessment of misting was done as follows:
Very good (ink mist is undetectable or minimal)
Good (small amount of ink mist is deposited on the paper)
Bad (large amount of ink mist is deposited on the paper)

TABLE 5

Experimental cyan inks

| Material | Example 17 | Example 18 |
|---|---|---|
| Varnish with inert lactic acid polyester resin from Example 10 in TMPTA (48%) | 45.15 | — |
| Varnish with acrylated lactic acid polyester resin Example 13 in TMPTA (80%) | — | 45.15 |
| Multifunctional acrylate monomer blend (Sun) | 16.00 | 16.00 |
| Flow agent (Tego) | 0.50 | 0.50 |

TABLE 5-continued

Experimental cyan inks

| Material | Example 17 | Example 18 |
|---|---|---|
| Stabilizer (Rahn group) | 1.00 | 1.00 |
| Photoinitiator blend based on aminobenzoates & benzophenones & aminoketones (Sun) | 13.00 | 13.00 |
| Blue pigment 15:3 (Sun) | 21.35 | 21.35 |
| Inorganic filler (Emerys) | 3.00 | 3.00 |
| Total | 100.00 | 100.00 |
| Viscosity @ 50 s-1 [Pa · s] | 66.80 | 33.36 |
| Tack 150 [units] | 168 | 245 |

TABLE 6

Performance of experimental cyan inks on Didde web offset press

| Printing Press results: | Example 17 | Example 18 |
|---|---|---|
| Ink duct setting in units | 2.25 | 2.0 |
| Printing speed (feet per minute) | 400 | 400 |
| Water window in % | 32-42 | 20-40 |
| Printed optical density in units | 1.58/1.50 | 1.57/1.49 |
| UV-cure results | 1 lamp high-Good | 1 lamp high-Good |
| Misting properties | Very good | Good |

Fountain solution: Rycoline ACFS 193; 5 ounces to each gallon of tap water.
Substrate: C1S (coated one side) paper

Example 19

Formulation and Printing of Flexographic UV-Ink Containing Acrylated Polyester Resins Based on Lactic Acid A flexographic UV ink pigment base can be made having the above-mentioned formulation on a three roll mill with a typical procedure known in the art, containing an acrylated polyester based on lactic acid from example 13, as shown in Table 7.

TABLE 7

Flexographic ink formulation

| Pigment concentrate: | weight % |
|---|---|
| Acrylated polyester from example 13 | 17.00 |
| LEO10502, low migration monomer (Monomer, Allnex Company) | 40.90 |
| Genorad 16 (inhibitor, Rahn Group) | 2.00 |
| EFKA 7701 (additive, BASF) | 5.50 |
| Permanent Orange G (pigment, Clariant Company) | 22.00 |
| Permanent Carmine FBB02 (pigment, Clariant Company) | 12.60 |
| | 100.00 |

Then, a "let-down" varnish solution can be made in a dissolver, having the formulation shown in Table 8.

TABLE 8

Flexographic let down varnish

| Let down varnish: | weight % |
|---|---|
| CN 2303 (Sartomer Company) | 32.00 |
| LEO10502, (low migration monomer, Allnex Company) | 38.80 |
| Laromer PO 94 F (aminoacrylate, BASF) | 20.00 |
| Genorad 16 (inhibitor, Rahn Group) | 2.00 |
| Irgacure 819 (photoinitiator, BASF) | 2.20 |
| 4-phenylbenzophenone (photoinitiator, IGM Resins) | 3.00 |
| KIP 75 LT (photoinitiator, Lamberti Company) | 2.00 |
| | 100.00 |

For making a UV-flexographic ink of this invention, the pigment base can be mixed with the let-down varnish in a disperser for 15 minutes in a 1:1 ratio and a UV flexographic ink can be obtained, having a viscosity of 1100 mPas at 25° C., measured with a Physika 300 cone and plate rheometer from Anton Parr GmbH at a shear rate of D=50 l/s.

Then, the ink can be printed on Corona treated PET plastic film (25 cm width) on a Chesnut printing press having an open chamber doctor blade system and ceramic anilox rollers (320 lines/cm), and then subsequently UV-cured with a Nitrogen-inerted (200 ppm oxygen) UV-bulb (240 W/cm) from Heraeus at a curing speed of 200 meter per minutes.

A printed matter, having a dry and solvent resistant ink film, with good adhesion to PET, can be obtained.

The present invention has now been described in detail, including the preferred embodiments thereof. However, it will be appreciated that those skilled in the art, upon consideration of the present disclosure, may make modifications and/or improvements on this invention that fall within the scope and spirit of the invention.

I claim:

1. A composition comprising a compound of a lactic acid polyester resin according to Formula 1 and an acrylic acid ester,

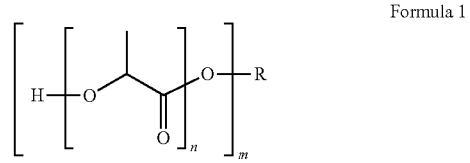

Formula 1 wherein:
R is selected from the group consisting of a di, -tri-, tetra-, penta- and hexavalent polyol;
n is an integer from 1-50; and
m is an integer from 1-6; and
wherein the lactic acid polyester resin according to Formula I has an acid value of 5 to 50 mg KOH/g; and
wherein the lactic acid polyester resin according to Formula I comprises at least 1% of a di-, tri-, tetra, -penta, or hexafunctional polyol; and
wherein the mass ratio of the acrylic acid ester to the lactic acid polyester resin according to Formula I is 1:1 to 2:1; and
wherein the weight average molecular weight of the lactic acid polyester resin is 1,505 to 3,400 Daltons.

2. The composition of claim 1, wherein the lactic acid polyester resin exhibits a molecular number average of >3000 Daltons.

3. The composition of claim 2, which is a tack reducing agent for lithographic or flexographic, ultraviolet or electron beam curable, inks when included in the ink at a concentration >10 weight %.

4. The composition of claim 1, wherein the acrylic acid ester is selected from the group consisting of 1,6-hexandiol diacrylate, dipropylene glycol diacrylate, neopentylglycol diacrylate, ethoxylated neopentylglycol diacrylate, propoxylated neopentylglycol diacrylate, tripropylene glycol diacrylate, ethoxylated bisphenol-A-diacrylate, bisphenol-A-diglycidyl ether diacrylate, ethoxylated bisphenol-A-diacrylates, poly(ethylene)glycol diacrylate, trimethylolpropane triacrylate, ethoxylated trimethylolpropane triacrylate, propoxylated trimethylolpropane triacrylate, propoxylated glycerol triacrylate, pentaerythritol triacrylate, ethoxylated pentaerythritol triacrylate, propoxylated pentaerythritol tetraacrylate, ethoxylated pentaerythritol tetraacrylate, ditrimethylolpropane tetraacrylate, dipentaerythritol pentaacrylate, dipentaerythritol hexaacrylate and ethoxylated dipentaerythritol hexaacrylate.

5. An energy curable ink or coating composition comprising the composition of claim 1.

6. The energy curable ink or coating composition of claim 5, comprising the composition of claim 1 in a concentration of about 2 to 70 weight %.

7. The energy curable ink or coating composition of claim 5, wherein the energy curable ink or coating composition is a lithographic energy curable ink or coating composition.

8. The energy curable ink or coating composition of claim 7, wherein the lithographic energy curable ink or coating composition has a viscosity of about 5-100 Pas at a shear rate of D=50 l/s.

9. The energy curable ink or coating composition of claim 5, wherein the energy curable ink or coating composition is a flexographic energy curable ink or coating composition.

10. The energy curable ink or coating composition of claim 9 wherein the lithographic energy curable ink or coating composition has a viscosity of about 500-2000 mPas at a shear rate of D=50 l/s.

11. A printed article comprising the energy curable ink or coating composition of claim 5.

12. The printed article of claim 11, wherein the printed article is a food packaging article.

13. A printed article comprising the energy curable ink or coating composition of claim 9.

14. The printed article of claim 13, wherein the printed article is a food packaging article.

* * * * *